United States Patent
Doerflinger et al.

(10) Patent No.: US 11,654,715 B2
(45) Date of Patent: May 23, 2023

(54) CASTER WHEEL

(71) Applicant: Snap-on Incorporated, Kenosha, WI (US)

(72) Inventors: David A. Doerflinger, Racine, WI (US); William T. Sharp, Pleasant Prairie, WI (US)

(73) Assignee: Snap-on Incorporated, Kenosha, WI (US)

( * ) Notice: Subject to any disclaimer, the term of this patent is extended or adjusted under 35 U.S.C. 154(b) by 298 days.

(21) Appl. No.: 15/952,931

(22) Filed: Apr. 13, 2018

(65) Prior Publication Data

US 2018/0319213 A1 Nov. 8, 2018

Related U.S. Application Data

(60) Provisional application No. 62/503,129, filed on May 8, 2017.

(51) Int. Cl.
*B60B 33/00* (2006.01)
*B60B 33/02* (2006.01)

(52) U.S. Cl.
CPC ...... *B60B 33/0078* (2013.01); *B60B 33/0039* (2013.01); *B60B 33/0084* (2013.01); *B60B 33/021* (2013.01); *B60B 33/025* (2013.01); *B60B 33/006* (2013.01); *B60B 2900/1212* (2013.01); *B60B 2900/561* (2013.01)

(58) Field of Classification Search
CPC .... Y10T 16/195; Y10T 16/186; B60B 33/021
See application file for complete search history.

(56) References Cited

U.S. PATENT DOCUMENTS

| 696,499 | A |   | 4/1902 | Schaibly |
|---|---|---|---|---|
| 1,998,236 | A | * | 4/1935 | Herold .................. B60B 33/021 188/74 |
| 2,068,160 | A | * | 1/1937 | Zeindler ................. B60B 33/02 16/35 R |
| 2,130,939 | A | * | 9/1938 | Williams .............. B62B 3/0631 254/1 OC |

(Continued)

FOREIGN PATENT DOCUMENTS

| CH | 350775 | 12/1960 |
|---|---|---|
| CN | 201030766 Y | 3/2008 |

(Continued)

OTHER PUBLICATIONS

Second Taiwan Office Action for Application No. 107115403 dated Apr. 29, 2019, 4 pages.

(Continued)

*Primary Examiner* — Victor D Batson
*Assistant Examiner* — Matthew J Sullivan
(74) *Attorney, Agent, or Firm* — Seyfarth Shaw LLP

(57) ABSTRACT

Disclosed are systems and methods for reducing friction on a brake arm of a caster wheel brake. A washer can be positioned between the brake arm and the support arm to reduce friction in this area. Lubricant can also be provided between the brake arm and the support arm, and also between the brake arm and the brake cam, to reduce the friction in these areas. The presently disclosed embodiments therefore allow less force to actuate the brake arm as compared to prior art caster wheels.

10 Claims, 3 Drawing Sheets

(56) References Cited

U.S. PATENT DOCUMENTS

| | | | | |
|---|---|---|---|---|
| 2,227,832 | A * | 1/1941 | Herold | B60B 33/021 188/72.8 |
| 2,262,433 | A * | 11/1941 | Uecker | B60B 33/021 16/35 R |
| 2,422,892 | A * | 6/1947 | Forbes | B60B 33/02 16/35 R |
| 2,861,850 | A * | 11/1958 | Nyblom | B66C 7/00 384/542 |
| 2,891,273 | A * | 6/1959 | Hutchinson | B60B 33/0002 16/20 |
| 2,900,659 | A * | 8/1959 | Snell | B60B 33/021 16/35 R |
| 2,905,275 | A * | 9/1959 | Kostolecki | B60B 33/021 188/74 |
| 2,910,880 | A * | 11/1959 | Procter | A01D 45/021 474/133 |
| 2,962,126 | A * | 11/1960 | Legge | F16D 49/00 188/74 |
| 2,972,163 | A * | 2/1961 | Ross | B60B 33/021 16/35 R |
| 2,976,562 | A * | 3/1961 | Black | B60B 33/0002 16/21 |
| 3,085,285 | A * | 4/1963 | Morlik | E04G 5/02 16/35 R |
| 3,041,656 | A | 7/1963 | Goodall | |
| 3,142,085 | A * | 7/1964 | Black | B60B 33/0002 16/21 |
| 3,467,981 | A * | 9/1969 | Josephe | B60B 33/021 16/35 R |
| 3,828,392 | A * | 8/1974 | Bolger | B60B 33/02 16/35 R |
| 3,985,208 | A | 10/1976 | Libhart | |
| 4,028,773 | A * | 6/1977 | Morgan | B60B 33/02 16/35 R |
| 4,077,087 | A | 3/1978 | Mooney | |
| 4,246,677 | A * | 1/1981 | Downing | B60B 33/02 16/35 R |
| 4,336,629 | A * | 6/1982 | Jarvis, Jr. | B60B 33/0078 16/35 R |
| 4,336,630 | A * | 6/1982 | Page | B60B 33/021 16/35 R |
| 4,349,938 | A | 9/1982 | Fontana | |
| 4,870,715 | A | 10/1989 | Schnuell | |
| 5,042,622 | A | 8/1991 | Smith et al. | |
| 5,402,864 | A | 4/1995 | Block et al. | |
| 5,497,856 | A | 3/1996 | Block et al. | |
| 5,509,506 | A | 4/1996 | Jones | |
| 5,566,788 | A | 10/1996 | Smith et al. | |
| 5,675,864 | A | 10/1997 | Chou | |
| 5,802,668 | A * | 9/1998 | Gosselin | B60B 33/0039 16/35 R |
| 6,810,560 | B1 * | 11/2004 | Tsai | B60B 33/021 16/20 |
| 6,854,567 | B2 * | 2/2005 | Suzuki | B60B 33/0007 16/35 R |
| 7,377,526 | B2 * | 5/2008 | Lan | B60B 33/001 16/18 R |
| 7,784,729 | B1 | 8/2010 | Hope | |
| 8,038,351 | B2 * | 10/2011 | Arnold | F16C 17/10 384/152 |
| 9,168,785 | B2 * | 10/2015 | Spektor | B60B 33/0049 |
| 9,387,723 | B2 * | 7/2016 | Beatty | B60B 33/0086 |
| 9,908,367 | B2 * | 3/2018 | Yamamoto | B60B 33/0086 |
| 2004/0123720 | A1 * | 7/2004 | Goto | G10D 3/14 84/304 |
| 2010/0107360 | A1 | 5/2010 | Shih | |
| 2013/0097804 | A1 * | 4/2013 | Weichbrodt | B60B 33/0042 16/47 |
| 2016/0146351 | A1 * | 5/2016 | Janian | |

FOREIGN PATENT DOCUMENTS

| | | |
|---|---|---|
| CN | 201309375 Y | 9/2009 |
| CN | 104176104 A | 12/2014 |
| CN | 204236134 | 4/2015 |
| GB | 2176395 | 12/1986 |
| GB | 2379385 | 3/2003 |
| JP | 55072402 | 5/1980 |
| JP | 04123902 | 4/1992 |
| JP | 2002002208 | 1/2002 |
| JP | 2003320802 | 11/2003 |
| JP | 2007203797 | 8/2007 |
| TW | M317941 | 1/2007 |
| WO | 9919157 A1 | 4/1999 |

OTHER PUBLICATIONS

Examiner's Report for co-pending Canadian Application No. 3,003,804 dated Apr. 3, 2019, 5 pages.

UK Combined Search and Examination Report for Application No. GB1807351.0 dated Oct. 12, 2018, 9 pages.

Jeff Brady, Jan. 5, 2017, "Caster Brake Assembly,", YouTube, available from: https://www.youtube.com/watch?v=ASLxeacONZI, accessed Dec. 6, 2018, 2 pages.

Servicecastercorp, Jul. 19, 2012, "4-Position Swivel Lock—Locking Caster Review," YouTube, available from https://www.youtube.com/watch?v=r6KASTLRYVQ, accessed Dec. 6, 2018, 2 pages.

Australian Examination Report for Application No. 2018203057 dated Jan. 3, 2019, 6 pages.

Taiwan First Office Action for Application No. 107115403 dated Jan. 10, 2019, 9 pages.

Examiner's Report for Canadian Application No. 3,003,804 dated Jan. 15, 2020, 3 pages.

Examination Report for Australian Application No. 2018203057 dated Dec. 17, 2019, 4 pages.

Chinese Office Action for Application No. 201810432806.6 dated Dec. 3, 2020, 9 pages.

Canadian Office Action for Application No. 3,003,804 dated Sep. 18, 2020, 4 pages.

Examination Report No. 2 for Application No. 2019284067 dated Feb. 23, 2021, 4 pages.

* cited by examiner

CASTER WHEEL

CROSS-REFERENCE TO RELATED APPLICATIONS

This application claims priority to provisional application No. 62/503,129 filed May 8, 2017, the contents of which are incorporated by reference herein in their entirety.

TECHNICAL FIELD OF THE INVENTION

The presently disclosed embodiments relate generally to caster wheels. More particularly, the presently disclosed embodiments relate to methods and devices for reducing the friction around a caster wheel lever.

BACKGROUND OF THE INVENTION

Caster wheels are a common structure used with mobile enclosures such as roll cabinets or carts. Caster wheels are easily attached to the cabinet and are often movable between a fixed mode in which the wheels align in one direction, and a rotatable position in which the wheels can swivel and allow more free steering of the mobile enclosure. The wheels are typically rotatable about an axle, where the axle is held in place by two support arms on opposite ends of the axle.

Caster wheel brakes are also popular as they allow the mobile enclosure to be selectively fixed in one position. The brakes often include a lever that, when engaged, prevents one or more of the wheels from moving to thereby maintain the mobile enclosure in one place. The brake arm can be spring loaded such that, when disengaged, the brake arm can rotate back to its original position.

The brake arm rotates against normal friction applied to the brake arm due to the manner in which the brake arm is coupled to the support arm. This friction can require increased force to fully engage the brake and fix the mobile enclosure in one place.

SUMMARY OF THE INVENTION

The presently disclosed embodiments broadly comprise a system and method for reducing friction on a brake arm of a caster wheel brake. The caster wheel can include a washer positioned, for example, between the brake arm and the support arm. Alternatively, or in addition to the above, the caster wheel can include lubricant provided between the brake arm and the support arm, and also between the brake arm and the brake cam.

In particular, at least some of the presently disclosed embodiments include a caster wheel including a base, a swivel coupled to the base, and a support arm coupled to the swivel at a first support end of the support arm. The support arm can include a second support end opposite the first support end, with a wheel rotatable coupled to the support arm at the second support end. The wheel can have a hole at a radial center of the wheel, with an axle extending through the hole of the wheel and coupling to the support arm. The caster wheel can further include a brake arm rotatably disposed about the axle, and a washer disposed between the brake arm and the support arm.

At least some of the presently disclosed embodiments further include a method of lubricating a caster wheel including providing the caster wheel having a base, a wheel rotatable coupled to the base by a support arm, a brake having a brake arm rotatably disposed about an axle with first and second axle ends, a head being located at the first axle end, and a nut being threadably coupled to threads at the second axle end. The method then includes loosening the nut without removing the nut from the axle, applying lubricant to the brake between the brake arm and the support arm, providing lubricant to the brake between the brake arm and a brake cam, and tightening the nut.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
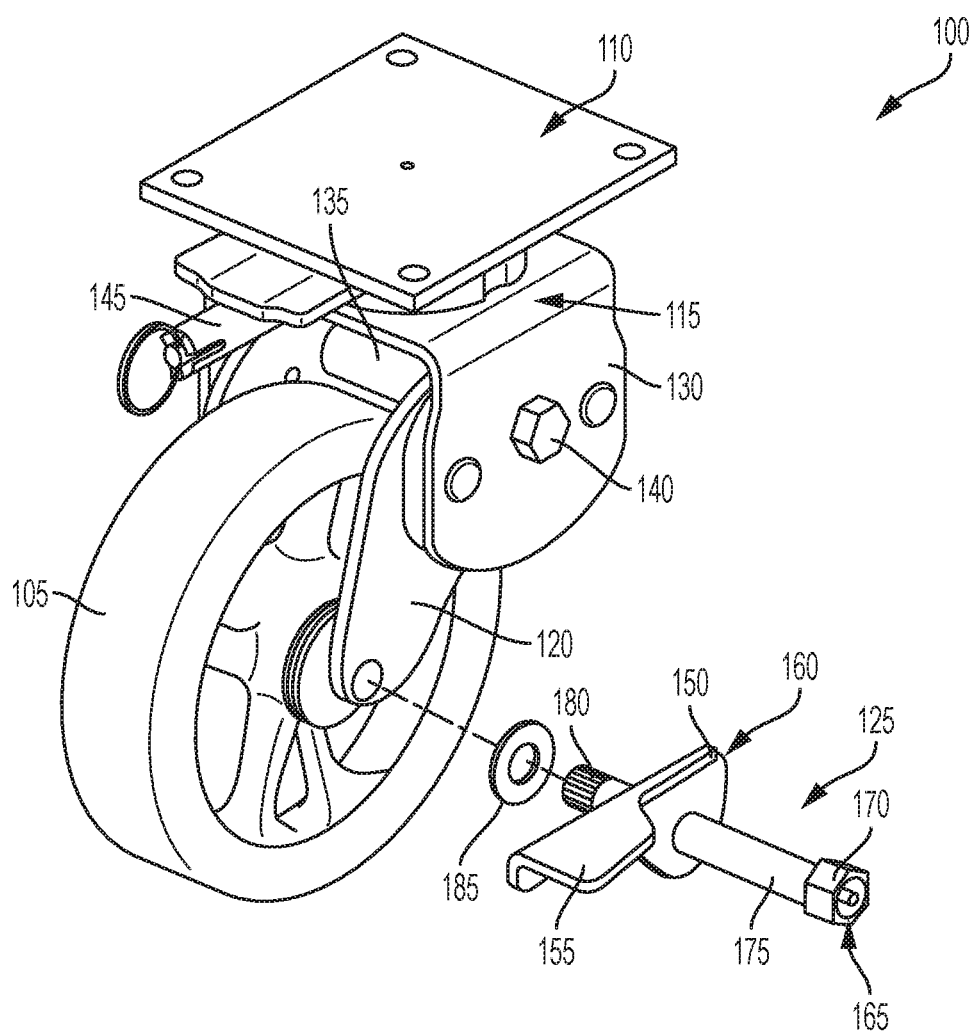
FIG. 1 is a partially exploded front perspective view of a caster wheel according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments broadly comprise devices and methods that reduce friction when a user actuates a brake arm of a caster wheel. For example, a washer can be provided between the brake arm and the support arm, or lubricant can be provided between the brake arm and the support arm, and also between the brake arm and the brake cam. In this manner, the brake arm can be actuated with less force as compared to if the washer and lubricant were not implemented, creating a more fluid actuation of the brake arm and better user experience.

Figure 2:
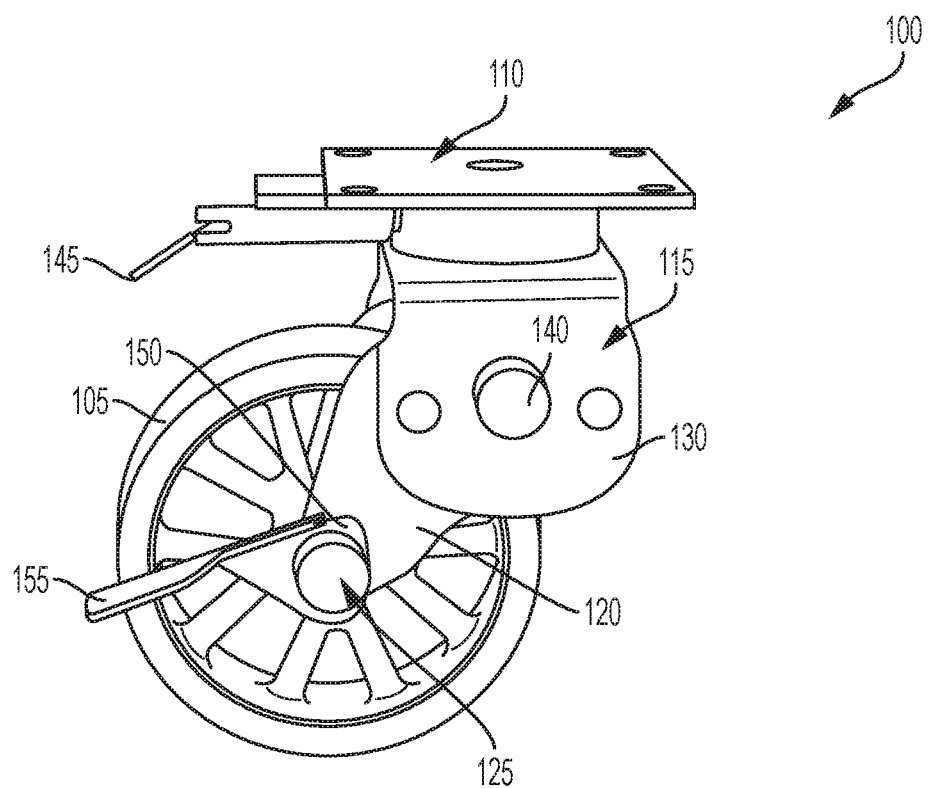
FIG. 2 is a front view of a caster wheel according to at least some of the presently disclosed embodiments.

As shown in FIGS. 1 and 2, a caster wheel 100 can include a wheel 105 coupled to a base 110 by a swivel 115. For example, the wheel 105 can be coupled to the swivel 115 by a pair of opposing support arms 120. The wheel 105 can be selectively held in a fixed position by a brake 125. As discussed below in more detail, various methods and devices can be implemented to decrease the tension required to initiate the brake, therefore requiring less force to place the caster wheel 100 in the braked position.

The swivel 115 can serve as the component of the caster wheel 100 that couples the wheel 105 and support arms 120 to the base 110. The swivel 115 includes a swivel bracket 130 that extends to the outsides of the support arms 120 and couples to the support arms 120. For example, a support pin 135 can extend from a first side to the second side of the swivel bracket 130 and couple the support arms 120 to the swivel 115, as shown in FIG. 1. The support pin 135 can take the form of a bolt, with a support head 140, for example a hexagonal head, located on a first end of the support pin 135; and a standard nut located opposite the support head 140 on a second end of the support pin 135 opposite the first end. The support pin 135 can extend through the pair of support arms 120 and the nut can couple to threads on the second end to couple the support pin 135 to the support arms 120.

The caster wheel 100 can operate in a swivel mode, where the wheel 105 is allowed to swivel, i.e. rotate about an axis perpendicular to the base; and a fixed mode, where the wheel 105 is fixed in a predetermined alignment. To select the swivel mode, a user can remove a locking pin 145 from a lock mechanism, and to select the fixed mode, the user can insert the locking pin 145 into the lock mechanism.

The brake 125 can include a lever 150 coupled to a handle 155, collectively termed the brake arm 160. The brake arm 160 can be rotatably coupled to an axle 165, as shown in FIG. 1. For example, the brake arm 160 can include a hole through which the axle 165 extends and about which the brake arm 160 rotates to actuate the brake and cause the caster wheel 100 to enter or exit the braked position. Similar to the support pin 135, the axle 165 can include an axle head 170 on a first end, with a shaft 175 connecting the axle head 170 to threads 180 at a second end. The threads 175 can then couple to a nut in a well-known manner and can be tightened until the brake 125 is sufficiently coupled to the support arms 120 and the wheel 105. In some embodiments, the wheel 105 can also rotate about the same axle 165 as the brake arm 160. For example, the wheel 105 can have a hole at its radial center and the axle 165 can extend through the hole. The brake arm 160 can include a first side facing the axle head 170 and a second side opposite the first side, facing the support arm 120.

As discussed above, the brake arm 160 can rotate downward to place the caster wheel 100 in a locked position in which the wheel 105 will not substantially rotate. In conventional caster wheels 100 the brake arm 160 actuates a cam brake where the brake arm 160 rotates and uses a cam to tighten a caster rig against a wheel. This method is effective but causes friction surrounding the brake arm 160. At least some of the presently disclosed embodiments implement a washer 185 to reduce this friction. For example, the washer 185 can be placed on the axle 165 between the brake arm 160 and the support arm 120. The washer 185 can be made of a high-lubricity material such as polytetrafluoroethylene (PTFE) to improve the friction reducing capabilities of the washer 185 with respect to the brake arm 160. In this manner, the user can implement the brake arm 160 and cause the caster wheel 100 to be engaged in the locked position, and subsequently release the brake arm 160, with less force and greater ease due to the friction-reducing qualities of the washer 185.

Figure 3:
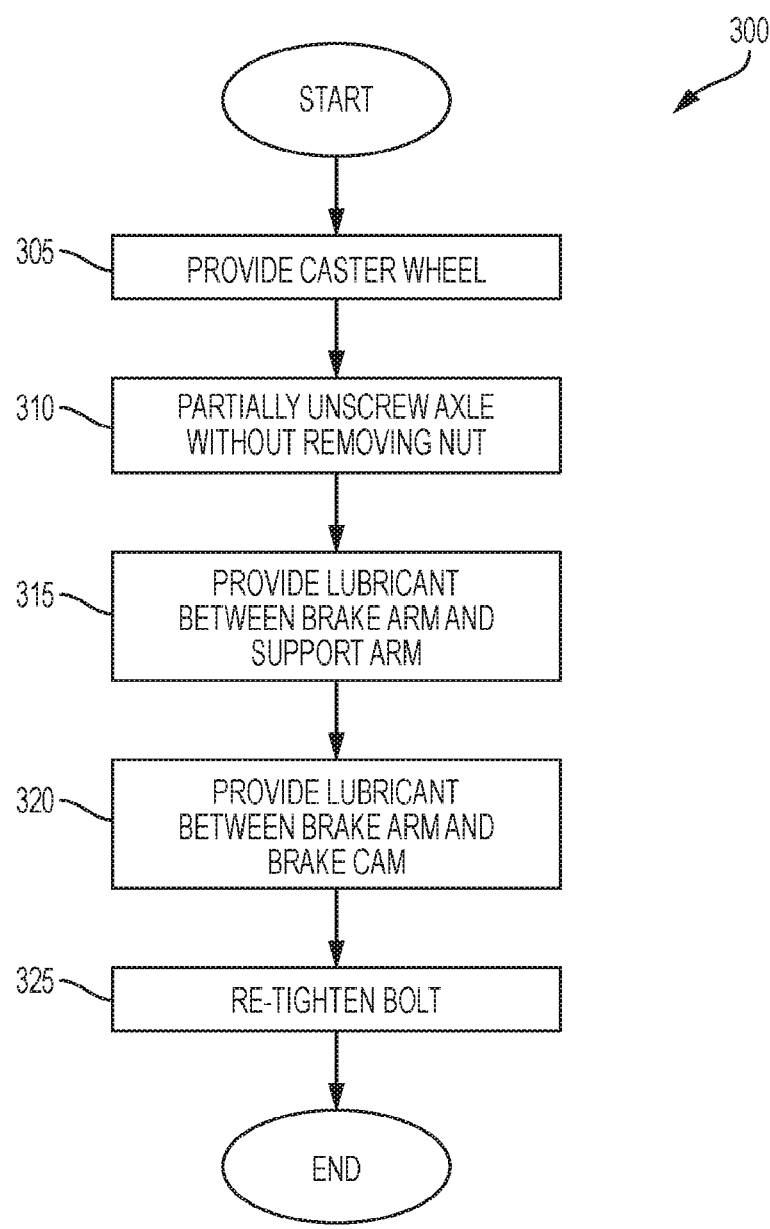
FIG. 3 is a flow chart illustrating a manner of reducing friction on a brake according to at least some of the presently disclosed embodiments.

As shown in FIG. 3, a second method can be implemented to reduce the friction surrounding the brake arm 160 using lubricant, such as grease. The method 300 of FIG. 3 can be implemented with the washer 185 system discussed above or separate and apart from any washer.

As shown, the method 300 begins and proceeds to step 305, where a caster wheel 100 is provided. This caster wheel 100 can be similar to the caster wheel discussed above and include any or all of the elements discussed above. The method 300 then proceeds to step 310 where the axle 165 is partially unscrewed. In doing so, the nut on the axle 165 is not to be removed entirely, but that the axle 165 is only partially unscrewed to allow for the lubricant to be inserted.

The method 300 then proceeds to step 315 where lubricant is provided between the brake arm 160 and the support arm 120. Similarly, in step 320, lubricant is provided between the brake arm 160 and the brake cam. The bolt is re-tightened in step 325 and the method 300 then ends.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A caster wheel comprising:
   a base;
   a swivel coupled to the base;
   a support arm having opposing first and second support ends, wherein the support arm is coupled to the swivel at the first support end;
   a wheel rotatably coupled to the support arm at the second support end, the wheel having a hole at a radial center of the wheel;
   an axle extending through the hole of the wheel and coupling to the support arm;
   a brake arm rotatably disposed about the axle; and
   a substantially flat washer disposed between the brake arm and the support arm, wherein the substantially flat washer is composed of a high-lubricity material adapted to reduce friction between the brake arm and the support arm.

2. The caster wheel of claim 1, wherein the brake arm includes opposing first and second sides, and further comprising a lubricant disposed on at least one of the first and second sides of the brake arm.

3. The caster wheel of claim 1, wherein the axle includes an axle head at a first axle end, threads at a second axle end opposite the first axle end, and a shaft extending between the first and second axle ends.

4. The caster wheel of claim 1, wherein the swivel is adapted to operate in a fixed mode, wherein the wheel is aligned in a selected orientation, and a swivel mode, wherein the wheel is rotatable about an axis perpendicular to the base.

5. The caster wheel of claim 4, further comprising a pin that is selectively insertable into the swivel to cause the caster wheel to selectively operate in either one of the fixed and swivel modes.

6. The caster wheel of claim 1, wherein the brake arm includes a lever and a handle extending from the lever, wherein the lever receives the axle.

7. The caster wheel of claim 1, wherein the swivel includes a swivel bracket having opposing first and second swivel bracket sides, and further comprising a support pin extending from the first swivel bracket side to the second swivel bracket side.

8. The caster wheel of claim 7, wherein the support pin couples the support arm to the swivel.

9. A method of lubricating a caster wheel comprising:
providing the caster wheel having a base, a wheel rotatably coupled to the base by a support arm, a brake having a brake arm rotatably disposed about an axle with first and second axle ends, a head located at the first axle end, a nut threadably coupled to threads at the second axle end, and a substantially flat washer disposed between the brake arm and the support arm, wherein the substantially flat washer is composed of a high-lubricity material;
loosening the nut without removing the nut from the axle;
applying a lubricant to the brake between the brake arm and the support arm;
providing the lubricant to the brake between the brake arm and a brake cam; and
tightening the nut.

10. A caster wheel comprising:
a base;
a swivel coupled to the base;
a support arm having opposing first and second support ends, wherein the support arm is coupled to the swivel at the first support end;
a wheel rotatably coupled to the support arm at the second support end, the wheel having a hole at a radial center of the wheel;
an axle extending through the hole of the wheel and coupling to the support arm;
a brake arm rotatably disposed about the axle; and
a substantially flat washer composed of polytetrafluoroethylene (PTFE) and disposed between the brake arm and the support arm, wherein the substantially flat washer reduces friction between the brake arm and the support arm.

* * * * *